(No Model.) 2 Sheets—Sheet 1.

J. J. JOHNSTON.
Process of and Apparatus for Manufacturing Gas.

No. 237,541. Patented Feb. 8, 1881.

Witnesses.
Fred G. Dieterich
Albert H. Krause

Inventor:
James J. Johnston (No Model.) 2 Sheets—Sheet 2.

J. J. JOHNSTON.
Process of and Apparatus for Manufacturing Gas.

No. 237,541. Patented Feb. 8, 1881.

Witnesses
Fred G. Dieterich
Albert H. Krause

Inventor
James J. Johnston

UNITED STATES PATENT OFFICE.

JAMES J. JOHNSTON, OF COLUMBIANA, OHIO, ASSIGNOR TO HIMSELF AND A. C. ELLIS, OF ALLEGHENY, PENNSYLVANIA.

PROCESS OF AND APPARATUS FOR MANUFACTURING GAS.

SPECIFICATION forming part of Letters Patent No. 237,541, dated February 8, 1881.

Application filed September 17, 1880. (No model.)

*To all whom it may concern:*

Be it known that I, JAMES J. JOHNSTON, of Columbiana, in the county of Columbiana and State of Ohio, have invented a new and useful Improvement in Manufacturing Gas for Illuminating and Heating Purposes; and I do hereby declare that the following is a full and exact description thereof, reference being had to the accompanying drawings, and to the letters of reference marked thereon.

My invention relates to an improvement in manufacturing gas for illuminating and heating purposes; and it consists in the composition, for the production of gas, composed of cotton-seed hulls, or cotton-seed with the oil extracted therefrom, and petroleum-oil.

It further consists in the process of distilling a mixture of cotton-seed hulls, or cotton-seed with the oil extracted therefrom, and petroleum-oil for the production of gas, and mixing with the gas evolved therefrom air or steam or air and steam and subjecting the mixture to a high degree of heat in a separate retort.

It finally consists in a novel apparatus for manufacturing the gas, all as will be hereinafter fully described, and specifically pointed out in the claims.

To enable others skilled in the art with which my invention is most nearly connected to make and use it, I will proceed to describe its construction and operation.

Figure 1:
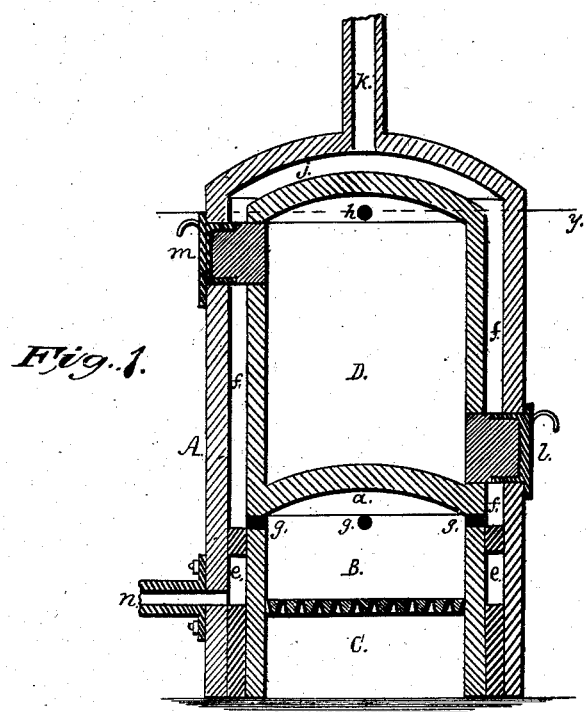
Figure 2:
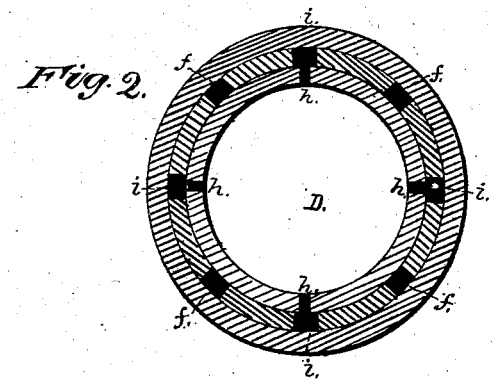
Figure 3:
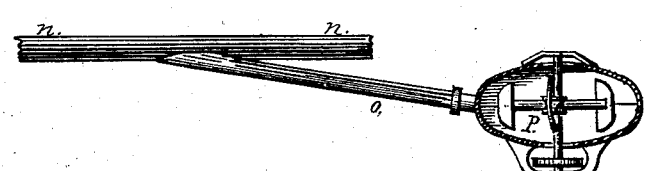
Figure 4:
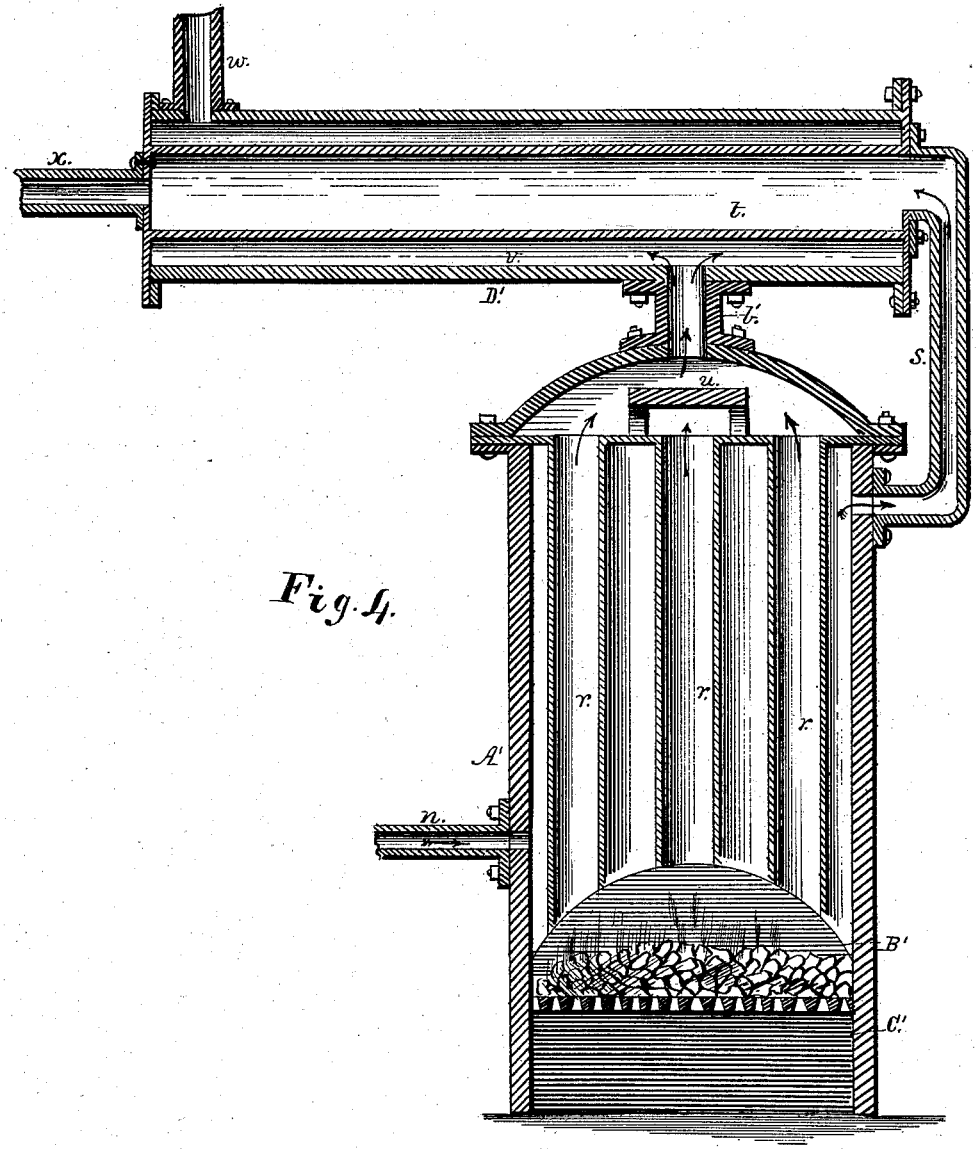

In the accompanying drawings, which form part of my specification, Figure 1 is a vertical section of my improvement in furnace and retort for evolving gaseous vapor from cotton-seed hulls and cotton-seed after the extraction of oil therefrom. Fig. 2 is a transverse section of the same at line $y$ of Fig. 1. Fig. 3 is a plan or top view of a pipe and fan used for drawing the gaseous vapor from the furnace and retort (represented in Figs. 1 and 2) and combining therewith air or steam, or air and steam united, and forcing said admixture into and through the reheating-retorts, represented in vertical section in Fig. 4.

In the manufacture of gas for illuminating and heating purposes I charge the retort D, through door $m$, with cotton-seed hulls, or cotton-seed after oil has been extracted therefrom, (as in the manufacture of cotton-seed oil.) The door $m$ is then closed and sealed. A fire is then started in the fire-chamber B of the furnace A, which is provided with an ash-pit, C, and flues $f\ h$, chambers $e\ j$, stack $k$, and a door, $l$, for withdrawing the residuum from the retort D, (which residuum is a good fertilizing agent, particularly for gardens and potatoes, which fact I have demonstrated by several trials or experiments, and have found that its presence in the garden and on potato-vines promotes growth and prevents to a great degree the ravages of bugs and insects on garden-plants and potato-vines.)

The fire in chamber B of the furnace A, acting against the bottom $a$ of the retort D, and heat passing from said chamber through openings $g$ into flues $f$ and up through them into chamber $j$ and out through the stack $k$, thereby heating the retort D, flues $i$, and evolve a gaseous vapor from the charge in said retort, which vapor passes through openings $h$ into flues $i$, and down through them into chamber $e$, which surrounds the fire-chamber B. The fan P, being put in motion, causes a current of air in pipe $n$, which will draw the vapor from chamber $e$, mixing it with the air in pipe $n$, and force the air and vapor, in a mixed condition, into the reheating-retort A', which is furnished with a fire-chamber, B', ash-pit C', and a series of flues, $r$. To the upper end of the reheating-retort A' is attached a second reheating-retort, D', having a central flue, $t$, which, by means of a pipe, $s$, communicates with the reheating-retort A'. A fire being made in the fire-chamber B', the heat passes up through the flues $r$ and up through the connection $b'$, as indicated by the arrows, and enters the space $v$, which surrounds the flue $t$ of the reheating-retort D', and, having performed its office, passes out through the stack $w$. The commingled air and gaseous vapor, in its passage through the reheating-retorts A' and D', is converted into a fixed gas, which may be conveyed by pipe $x$ to a cooling device, and from it into a gas-holder.

When it is desirable to combine steam and air with the gaseous vapor hereinbefore described a steam-siphon is used, instead of the fan P.

The union of petroleum-oil with cotton-seed hulls, or cotton-seed after the extraction of oil therefrom, is accomplished in the following manner: I take, by weight, about ninety-five (95) parts cotton-seed hulls or cotton-seed after the extraction of oil therefrom, and saturate or impregnate them by any suitable means with about five parts of petroleum-oil, and charge the said hulls or seed thus treated into the retort D and subject the vapor evolved therefrom to the action of the reheating-retorts A' and D', as hereinbefore described, with or without the admixture of air or air and steam; but a better result is obtained when air or air and steam is combined with the vapors coming from the retort D.

I am aware that various oil-seed cakes, also various kinds of seeds, including cotton-seed before the oil is extracted therefrom, have been used for the production of gas, as well as the distillation of the mixture of sawdust and liquid hydrocarbon. I am also aware that the dilution of a rich gas with air and steam and subsequently heating the mixture is old, all of which I do not wish to be understood as claiming, broadly, as of my invention.

I do not wish to be understood as claiming, broadly, in this case the gaseous product evolved from cotton-seed hulls, or cotton-seed after the extraction of oil therefrom, mixed with air or steam and subjected to a high degree of heat in a separate retort; nor do I wish to be understood as claiming in this case the fertilizing agent consisting of the product obtained from cotton-seed hulls or cotton-seed with the oil extracted after evolving the gaseous matter therefrom, as they will form the subject of subsequent applications.

Having thus described my improvement, what I claim as of my invention is—

1. The herein-described composition for the production of gas, composed of cotton-seed hulls, or cotton-seed with the oil extracted therefrom, and petroleum-oil, substantially as specified.

2. The process of manufacturing gas, which consists in distilling a mixture of cotton-seed hulls, or cotton-seed with the oil extracted therefrom, and petroleum-oil for the production of gas, and mixing with the gas evolved therefrom air or steam, or air and steam, and subjecting the mixture to a high degree of heat in a separate retort, substantially as specified.

3. The apparatus for manufacturing gas, consisting of the furnace A, retort D, and reheating-retorts A' and D' and air or steam-blast device, said parts constructed, arranged, and operating with relation to each other, substantially as herein described, and for the purpose set forth.

JAMES J. JOHNSTON.

Witnesses:
A. C. JOHNSTON,
W. S. COLWELL.